Dec. 13, 1960 W. R. MacLEAN 2,964,608
INDUCTION HEATING THERMOSTABLE WORK CIRCUIT
Filed Sept. 30, 1958

INVENTOR.
WILLIAM R. MacLEAN
BY Wade Loomy
ATTORNEY
Richard J. Killoren
AGENT

United States Patent Office 2,964,608
Patented Dec. 13, 1960

2,964,608

INDUCTION HEATING THERMOSTABLE WORK CIRCUIT

William R. MacLean, Brooklyn, N.Y., assignor to the United States of America as represented by the Secretary of the Air Force Filed Sept. 30, 1958, Ser. No. 764,465

3 Claims. (Cl. 219—10.75)

This invention relates to a thermostable work circuit for induction heating.

One object of the invention is to provide an induction heating circuit in which the load on the oscillator does not increase as the temperature rises.

Another object is to provide an induction heating circuit in which nearly the full power of the oscillator may be utilized throughout the heating cycle.

These and other objects will be more fully understood from the following detailed description taken with the drawing wherein.

Figure 1:
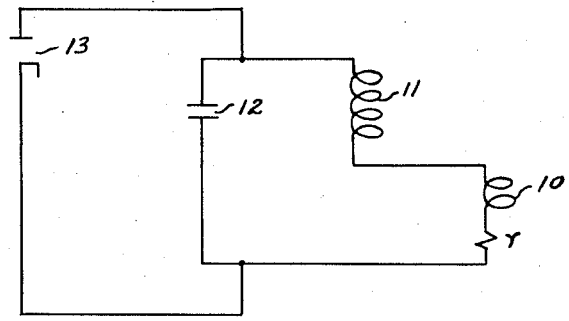
Fig. 1 shows the usual circuit used for induction heating.

In the usual application of induction heating the work coil is simply placed in series with the tank circuit of the oscillator. This scheme is shown in fragmentary form in the circuit of Fig. 1 of the drawing wherein the work coil 10 is connected in series with the tank coil 11. Tank coil 11 together with condenser 12 form the tank circuit for the oscillator shown schematically at 13. The effective resistance of the work coil is shown schematically at $r$. This resistance is in series with the tank coil 11. The existence of a series resistance $r$ in the tank coil circuit results in the reflection of a definite load into the plate circuit of the oscillator 13. Since the tank circuit is resonant, the load on the plate is increased when the series resistance increases. In the usual induction heating circuit, the series resistance $r$ increases due to the rise in the temperature of the work piece. As a result of this, the load on the oscillator increases and causes the plate current into the oscillator to rise. There is usually an upper limit for the plate current imposed by the maximum power capacity of the equipment and when this limit is reached the plate circuit breaker opens and turns off the current. In setting up the usual induction heating system for maximum speed of heating (below the curie point), it is necessary to adjust the parameters so that maximum plate current is attained at the end of the heating cycle. Therefore, the full power of the oscillator is not utilized during the early portion of the heating cycle.

Figure 2:
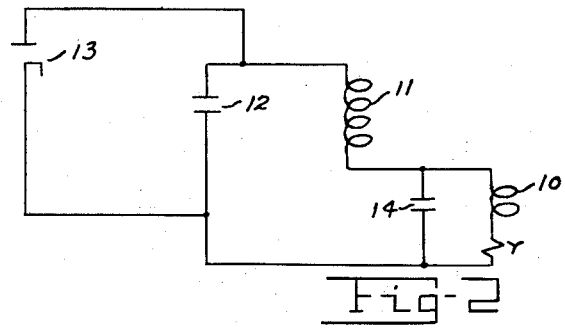
Fig. 2 shows a modification of the circuit of Fig. 1 according to the invention.

According to this invention, a condenser 14 is placed in shunt with the work coil 10 as shown in Fig. 2. If the value of this condenser is properly chosen, the load on the oscillator will not increase when the temperature rises. The configuration of the circuit alone is not sufficient to accomplish this purpose, but it is also necessary that the condenser 14 have the correct value.

Figure 3:
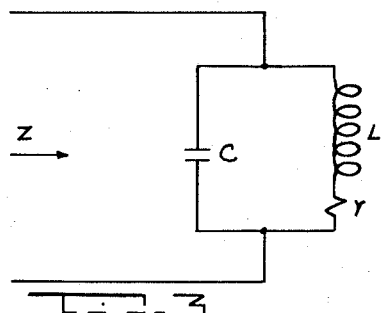
Fig. 3 shows the load section for the circuit of Fig. 2.

A mathematical evaluation will show what this value should be. For the purpose of this evaluation, the load section of the circuit of Fig. 2 is shown in Fig. 3 wherein Z indicates the input impedance to the circuit. The expression for this impedance is $$Z = \frac{(r+j\omega L)\left(\frac{1}{j\omega C}\right)}{r+j\left(\omega L - \frac{1}{\omega C}\right)} \quad (1)$$

where $\omega$ is the radian frequency of the current used and the other symbols are those shown in Fig. 3. This expression can be rationalized to give the expression $$Z = \frac{\frac{r}{\omega^2 C^2} - j\left(\frac{r^2}{\omega C} + \frac{\omega L^2}{C} - \frac{L}{\omega C^2}\right)}{r^2 + \left(\omega L - \frac{1}{\omega C}\right)^2} \quad (2)$$

of which the expression for the real part R is $$R = \frac{\frac{r}{\omega^2 C^2}}{r^2 + \left(\omega L - \frac{1}{\omega C}\right)^2} \quad (3)$$

As the temperature varies the resistance $r$ of the work coil will change and this may or may not result in a change in the input resistance R. If the derivative of R with respect to $r$ is zero, R will not increase as the value of $r$ increases. By calculating the derivative of R with respect to $r$ and setting the derivative equal to zero, R max will be found so that the necessary value for $r$, so that R will not increase will, be derived. When the circuit is adjusted so that these conditions are satisfied, the circuit is in thermostable adjustment. By differentiating Equation 3 and setting the derivative equal to zero, the following expression is obtained for the required value of $r$ so that the circuit is in thermostable adjustment $$r = \left|\omega L - \frac{1}{\omega C}\right| \quad (4)$$

In other words, the resistance $r$ of the work coil must be equal in magnitude to the total loop reactance of the loop shown in Fig. 3. It will usually be advantageous to have the condenser C as small as possible and therefore to have the capacitive reactance larger than the inductive reactance. Although not absolutely essential it will be assumed that, $$\frac{1}{\omega C} > \omega L \quad (5)$$

It can be seen from Equation 4 that the thermostable adjustment can be achieved by properly choosing the value of the condenser C. It is now interesting to inquire into the exact value of the input resistance R when the circuit is in thermostable adjustment. With the limitation of Expression 5 Expression 4 becomes $$r = -\left(\omega L - \frac{1}{\omega C}\right) \quad (6)$$

By substituting the thermostable proportion of (6) into (3) the input resistance R when the circuit is in thermostable adjustment is found to be $$R = \frac{r}{2}\left(\frac{\omega L}{r} + 1\right)^2 \quad (7)$$

If $$\frac{\omega L}{r}$$

is equal to 1, the input resistance to the composite circuit of Fig. 3 is precisely double the resistance of the work coil itself. It can be seen that the prescribed value of the effective resistance R as shown in Equation 7 can not be attained by the adjustment of the work coil condenser 14.

Figure 4:
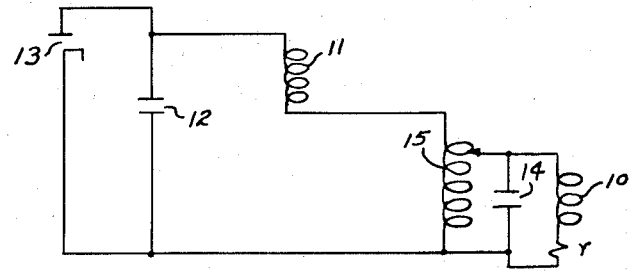
Fig. 4 shows a practical embodiment of an induction heating circuit according to the invention.

This adjustment can be obtained, however, by varying the number of turns in the work coil. Another convenient method for providing this adjustment is by introducing an autotransformer 15 shown in Fig. 4 into the circuit of Fig. 2. By means of this autotransformer, the load introduced in series with the tank coil may be adjusted. Such an adjustment does not in any way influence the thermostable adjustment of the work coil circuit itself. As can be seen then, the work coil circuit can be placed in thermostable adjustment by selecting the value of the work coil condenser 14 and the prescribed value of the effective load resistance R can be achieved by adjustment of the autotransformer 15.

There is thus provided an induction heating circuit in which the load on the oscillator does not increase as the temperature of the work coil rises and in which nearly the full power of the oscillator may be utilized throughout the heating cycle.

Though one specific embodiment has been described in some detail, it is obvious that numerous changes may be made without departing from the general principles and scope of the invention.

I claim:

1. An induction heating circuit comprising an oscillator having a radian frequency ω, said oscillator having a tank circuit with a tank coil therein, a heating coil having an inductance L and a resistance r, a capacitor connected in parallel with said heating coil, means for connecting said heating coil and said capacitor in series with said tank coil of said oscillator, the value of C of said capacitor being chosen to satisfy the relation, $$r = \left| \omega L - \frac{1}{\omega C} \right|$$

2. An inducting heating circuit comprising an oscillator having a radian frequency ω, said oscillator having a tank circuit with a tank coil therein, a heating coil having an inductance L and a resistance r, a capacitor connected in parallel with said heating coil, means for connecting said heating coil and said capacitor in series with said tank coil of said oscillator, the value of C of said capacitor being chosen to satisfy the relation, $$r = \left| \omega L - \frac{1}{\omega C} \right|$$

said means for connecting said heating coil and said capacitor to said oscillator tank coil including means for varying the effective resistance of the work circuit presented to the oscillator.

3. An induction heating circuit comprising an oscillator having a radian frequency ω, said oscillator having a tank circuit with a tank coil therein, a heating coil having an inductance L and a resistance r, a capacitor connected in parallel with said heating coil, means for connecting said heating coil and said capacitor in series with said tank coil of said oscillator, the value of C of said capacitor being chosen to satisfy the relation, $$r = \left| \omega L - \frac{1}{\omega C} \right|$$

said means for connecting said heating coil and said capacitor to said oscillator tank coil being an autotransformer whereby the effective resistance of the work circuit presented to the oscillator may be varied.

References Cited in the file of this patent

UNITED STATES PATENTS 2,205,424    Leonard _____ June 25, 1940

OTHER REFERENCES

Fundamentals of Radio, Terman, 1938, McGraw-Hill Book Co., Inc., page 30.

A new System of Inductive Tuning by Paul Ware, Proceedings of the Institute of Radio Engineers, vol. 26, No. 3, March 1938, pages 316 and 317.

Radio-Frequency Heating Equipment, by L. L. Langton, 1949, Pitman Publishing Corp., pages 104 and 105.